May 28, 1935. D. B. LEE 2,002,898
VEHICLE VENTILATING WINDOW
Filed April 30, 1934 2 Sheets-Sheet 1

INVENTOR
Dwight B. Lee
BY
ATTORNEYS

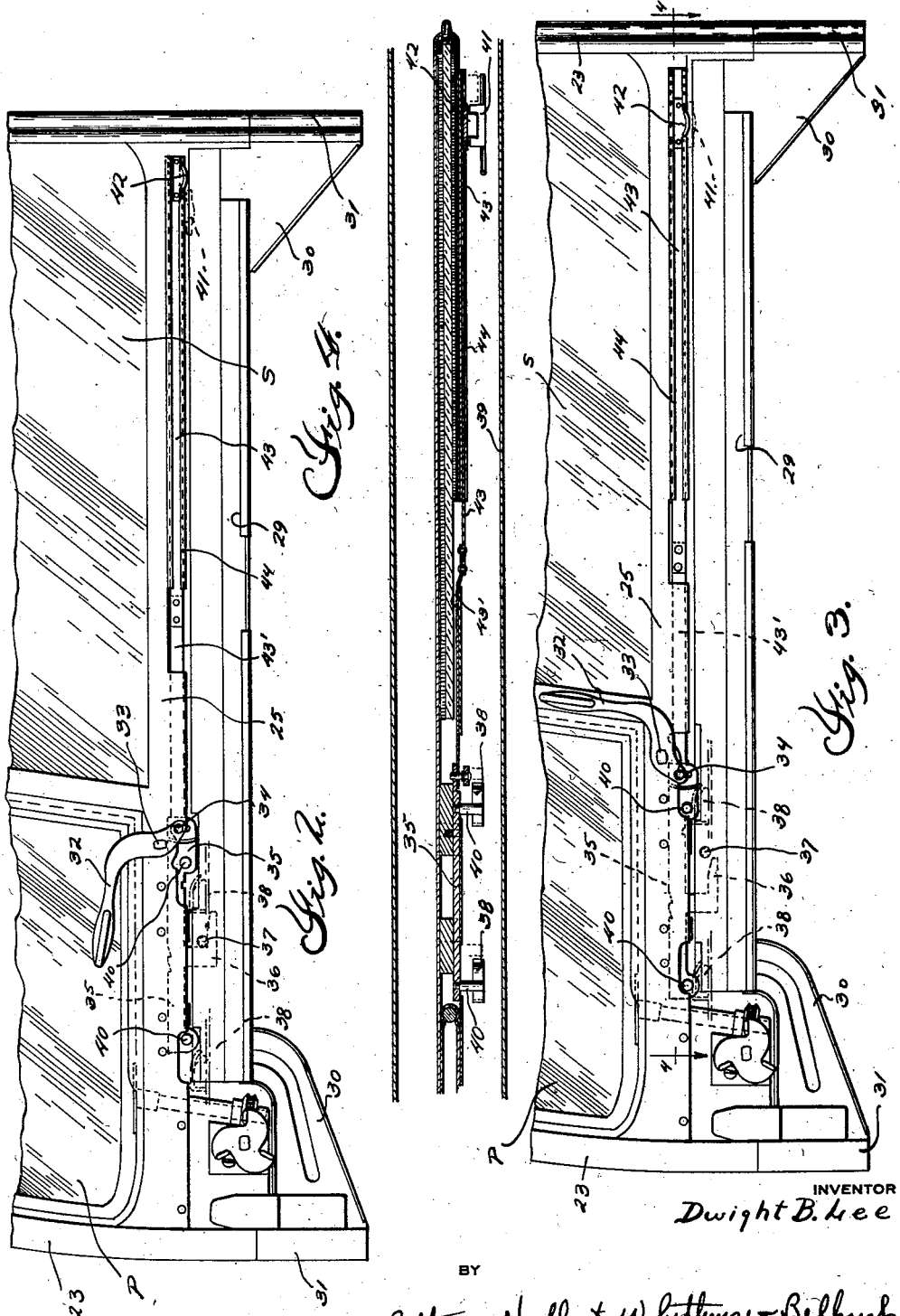

Patented May 28, 1935

2,002,898

UNITED STATES PATENT OFFICE 2,002,898

VEHICLE VENTILATING WINDOW

Dwight B. Lee, Detroit, Mich.

Application April 30, 1934, Serial No. 723,253

7 Claims. (Cl. 296—44)

This invention relates to vehicle ventilating windows and more particularly to improvements in the type of ventilating windows shown and described in my copending application Serial No. 691,882.

Ventilating window constructions of the type to which this invention pertains comprise a composite window including pivoted and sliding panels operable independently of one another in effecting the control of the ventilating window, and also operable as a unit so that they may be simultaneously raised into or lowered from the window opening.

The type of construction just referred to includes a frame in which the pivoted panel is mounted which frame is adapted in one position of the parts to be raised into registration with the window opening and rigidly supported while permitting the raising and lowering of the slidable panel by the usual window lifter mechanism.

One of the important objects of this invention is to provide simple but effective means for rigidly but releasably supporting the said frame in registration with the window opening during that position of the parts in which the regulator mechanism is disconnected therefrom.

The several objects, advantages and novel details of construction of the invention will be made more apparent as this description proceeds, especially when considered in connection with the accompanying drawings, wherein.

Figure 2 is an enlarged fragmentary elevational view of the control mechanism;

Figure 3 is a view similar to Figure 2 showing the parts in different position;

Figure 4 is a horizontal sectional view taken substantially on the plane indicated by line 4—4 in Figure 3;

As described more fully in my copending application heretofore referred to, the herein referred to type of ventilating window structure comprises a pivoted panel P and a sliding panel S adapted to cooperate to close a window opening 20 arranged, for instance, in the door 21 of a motor vehicle or the like 22, together with means for operating the pivoted and sliding panels independently of one another and provided further with means for simultaneously raising and lowering the pivoted and sliding panels as a unit.

Figure 1:
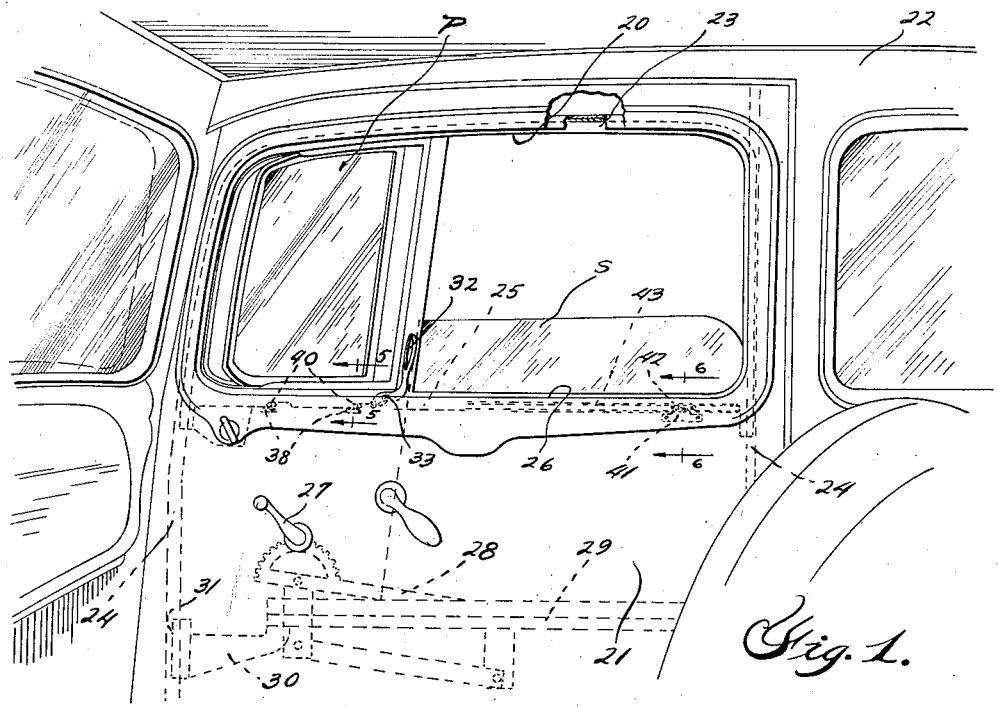
Figure 1 is a fragmentary perspective view of the inside portion of the front of a closed motor vehicle body having my improved ventilating window associated therewith.
Figure 5:
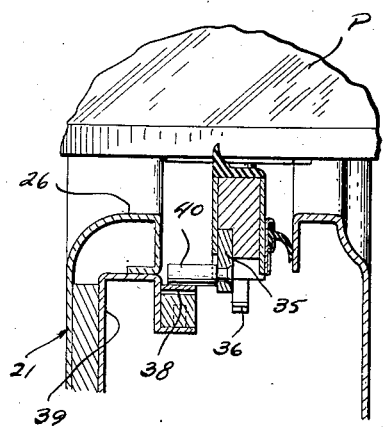
Figure 5 is an enlarged fragmentary vertical sectional view taken substantially on the plane indicated by line 5—5 in Figure 1.
Figure 6:
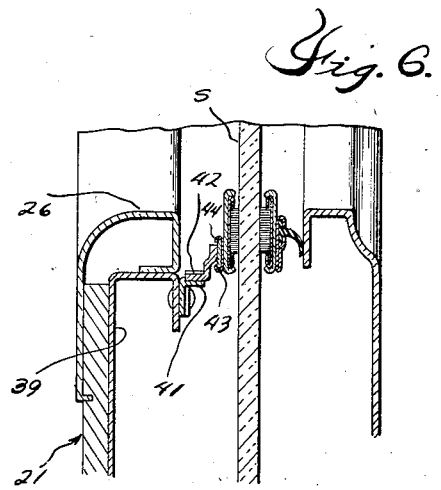
Figure 6 is a similar view taken substantially on the plane indicated by line 6—6 in Figure 1.

As seen probably best from Figure 1, the structure comprises a frame 23 usually of inverted substantially U-shaped contour, the vertical legs of which are adapted to slide in the conventional vertically arranged channels 24. Extending between the vertical legs of the frame 23 is a transverse frame member 25.

The pivoted panel P is pivotally supported intermediate its vertical edges on the frame 23—25, and this frame together with the pivoted panel P and the sliding panel S is adapted to be raised into registration with the window opening or lowered into the usual well. In the raised position of the frame the upper portion of the frame part 23 is adapted to register or coincide with the opening 20, whereas the transverse frame member 25 is located at substantially the level of the sill 26 of the window opening. The frame 23, together with the panels P and S, is adapted to be raised and lowered as a unit, or the panel S is adapted to be raised and lowered independently by means of any conventional type of window lifter mechanism. In the embodiment of the invention herein illustrated this mechanism comprises a regulator having an operating handle 27 and a lifter arm 28, the button or roller of which engages a glass retainer or channel 29. The retainer 29 is provided with extensions 30 carrying shoes 31 which form continuations of the vertical legs of the frame 23 and are adapted to slide in the vertical channels 24.

The lower edge of the sliding panel S is secured to the retainer 29 and this retainer 29 is adapted to be selectively coupled or uncoupled with the frame 23—25 whereupon the regulator may be operated either to raise and lower the sliding panel independently of the frame, as suggested in Figure 1, or to raise and lower this frame together with the panels P and S.

The frame 23—25 is adapted to be selectively coupled or uncoupled with the retainer 29 by means of a control or locking handle 32. This handle is shown as pivotally supported as at 33 on the transverse frame member 25, and the lower end of this handle is pivotally connected as at 34 to a slide bar 35 slidably supported in the transverse frame member 25.

The slide bar 35 is provided with a hook-shaped portion 36 which in one position of the bar is adapted to engage a pin 37 extending transversely of the retainer 29. When this hook-shaped portion 36 engages the pin 37 the frame 23—25 is coupled to the retainer 29 so that the entire frame together with the two panels may be raised and lowered by the regulator.

In the other position of the parts, however, it is essential that the frame be rigidly supported in the window opening and to accomplish this means is provided for coupling or engaging the frame 23—25 with fixed supports carried by stationary portions of the door 21 or other adjacent structure. In my copending application heretofore referred to, I provided a plurality, preferably two, supporting members 38 carried by and projecting from preferably the inner panel 39 of the door. These two supports are adapted to be engaged by laterally projecting pins 40 carried by the slide bar 35. The pins 40 and supports 38 are so arranged that when the hook-shaped member 36 engages the pin 37 the pins 40 are out of engagement with the supports 38 and vice versa.

In ventilating wondows for relatively wide doors, it is preferable to provide additional supporting means for the frame 23—25 disposed preferably adjacent the other vertical edge of the frame so that the frame will not sag or move out of registration with the window opening at this remote vertical edge.

To accomplish this, I provide an additional support 41 secured preferably to the inner panel 39 of the door and projecting therefrom. This support is adapted to be engaged by a projecting ear or lug 42 carried by a member 43 forming an extension of the slide bar 35. This extension may be formed in two sections as illustrated, the other section 43' thereof being slidably supported on the inner face of the frame member 25, the section 43 of the extension being slidably supported on the outer face of the transverse frame member 25 by means of a channel member or the like 44. The lug or projection 42 and the support 41 are so arranged with relation to one another and with relation to the pins 40 and supports 38 that the pins and projection engage their respective supports when the handle for instance is in the substantially vertical position illustrated in Figure 3 and are moved out of engagement with their respective supports when the handle is in the position shown in Figure 2. Thus with the parts in the position shown in Figure 3 the frame 23—25 is rigidly supported in registration with the window opening and the frame is uncoupled from the retainer 29 so that the sliding panel S may be raised and lowered by the regulator independently of the rest of the structure. This is also the position of the parts illustrated in Figure 1. When the parts are in the position illustrated in Figure 2, however, the slide bar 35 has been moved to engage the hook-shaped projection 36 thereof with the pin 37 of the retainer 29 and to disengage the pins 40 and projection 42 from their respective supports whereupon the frame, together with the panels P and S, are raised and lowered upon operation of the regulator.

From the foregoing, it will be apparent that by means of the pins 40 and lug or projection 42 and the corresponding supports 38—41, the frame 23—25 may be coupled to and rigidly supported on the stationary part of the door. These supports being fixed with relation to the window opening, the frame will thus be held in proper relation and registration with the window opening and any sagging of the frame which might interfere with the operation of the sliding panel S, or which might cause the frame to bind in its guides 24, is eliminated.

While the embodiment of the invention herein illustrated has been found in practice to give entirely satisfactory results, nevertheless reservation is made to make such changes in the herein illustrated details of construction as may come within the purview of the accompanying claims.

What I claim as my invention is:

1. In a ventilating window construction for a vehicle body having a window casing, a frame slidable in said casing into and out of registration with the window opening, a bar slidably mounted on said frame, fixed supports carried by said casing, and a plurality of members spaced longitudinally of said bar engageable with said supports for securing said frame in position in registration with the window opening.

2. In a ventilating window construction for a vehicle body having a window casing, a frame slidable in said casing into and out of registration with the window opening, a pair of supports carried by a stationary part of the window casing and arranged adjacent each vertical side of said frame, and means carried by said frame selectively engageable with said fixed supports for securing said frame in position in registration with the window opening.

3. In a ventilating window construction for a vehicle body having a window casing, a frame slidable in said casing into and out of registration with the window opening, a window lifter mechanism, a plurality of fixed supports carried by the window casing in spaced relation to each other and a bar slidably supported upon said frame having portions predeterminedly spaced from each other for engaging the fixed supports upon movement of the bar in one direction and having another portion engageable with the window lifter mechanism upon movement of the bar in the opposite direction to disengage the portions aforesaid thereof from the fixed supports.

4. In a ventilating window construction for a vehicle body having a window casing, a frame slidable in said casing into and out of registration with the window opening, a plurality of fixed supports carried by the window casing at the lower side of the window opening and a bar slidably mounted upon the frame and having portions predeterminedly spaced from each other to engage the fixed supports upon sliding movement of the bar in one direction.

5. In a ventilating window construction for a vehicle body having a window casing, a frame slidable in said casing into and out of registration with the window opening, a closure for the window opening including a panel slidably mounted in the frame, a window lifter mechanism operatively connected to the panel for sliding the latter relative to the frame, a fixed support on the casing, and means carried by the frame for movement into engagement with the fixed support to secure the frame in position in registration with the window opening.

6. In a ventilating window construction for a vehicle body having a window casing, a frame slidable in said casing into and out of registration with the window opening, a closure for the window opening including a panel slidably mounted in the frame, a window lifter mechanism operatively connected to the panel for sliding the latter relative to the frame, a fixed support upon the window casing, and means carried by the frame and selectively engageable with the window lifter mechanism and with said support.

7. In a ventilating window construction for a vehicle body having a window casing, a frame slidable in said casing into and out of registration with the window opening, a closure for the window opening including a panel slidably mounted in the frame, a window lifter mechanism operatively connected to the panel for sliding the latter relative to the frame, a plurality of fixed supports carried by the window casing, and a bar slidably mounted upon the frame having portions predeterminedly spaced from each other to engage the fixed supports upon movement of the bar in one direction and having another portion engageable with the window lifter mechanism upon movement of the bar in the opposite direction to disengage the portions aforesaid from the fixed support.

DWIGHT B. LEE.